Aug. 9, 1949.  R. D. COLLINS ET AL  2,478,861
METHOD OF REVERSING ELASTIC COIL STRUCTURES
Filed Sept. 6, 1945
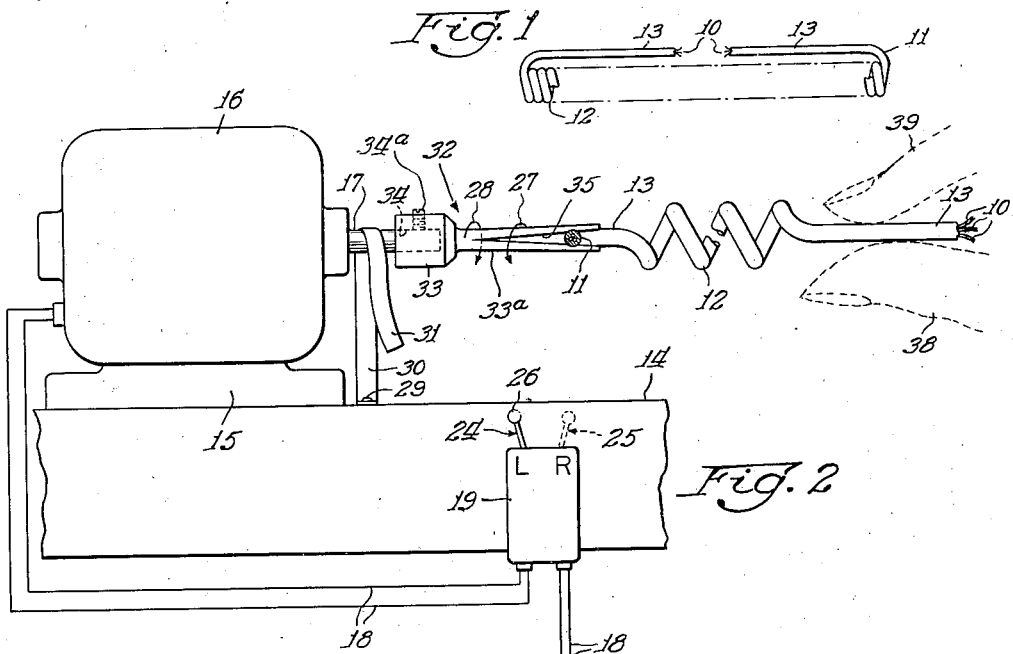
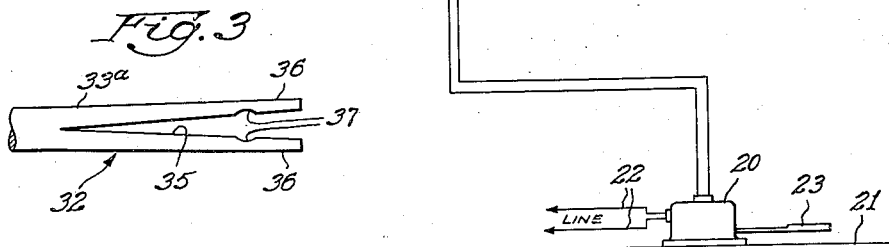
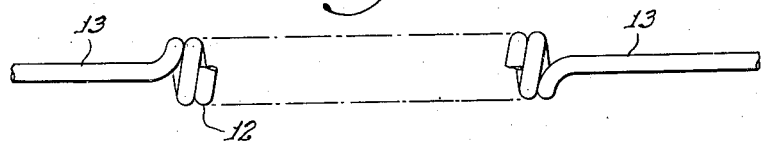
Inventors:
Ralph D. Collins and
Ralph J. Arnold
By A. Trevor Jones
Atty.

Patented Aug. 9, 1949

2,478,861

UNITED STATES PATENT OFFICE 2,478,861

METHOD OF REVERSING ELASTIC COIL STRUCTURES

Ralph D. Collins, Beverly Hills, Calif., and Ralph J. Arnold, Western Springs, Ill., assignors, by mesne assignments, to said Collins Application September 6, 1945, Serial No. 614,780

2 Claims. (Cl. 18—48)

This invention relates to a method for reversing elastic coil structures such as cables or the like and more particularly such cables embodying a centermost helically coiled portion with straight uncoiled ends which may be conveniently used as connecting tails for the cable, and whereby the direction of pitch of their helices is inverted.

It is now well known that retractile and extensible extension cords or cables, for various purposes, principally electrical, may be satisfactorily constructed by providing a conductor or a plurality of conductors with a covering or sheath of incompletely vulcanized rubber or the like, then closely coiling it into the form of a helix, and then vulcanizing it, after which the cable will be readily extensible, as, for example, for extension cord purposes, without damage thereto while being automatically retracted by its own resilience to closely coiled helical formation when released.

It is further well known that the resilience and retractibility of the cable may be enhanced by reversing the direction of the coils of the cable after the vulcanization in initial coiled form. Various methods and means have heretofore been proposed for reversing the cable, one such being disclosed in the Wilson Patent No. 2,248,149 of July 8, 1941, and which contemplated a pair of parallel mandrels upon one of which the unreversed cable is coiled, and the transference of the cable from the first mandrel to the other during which the cable is coiled upon the second mandrel with its pitch reversed. Another method is shown in the Barrans Patent No. 2,271,057 of January 27, 1942, which discloses the drawing of one end of the initially coiled cable through the coil thereof to reverse the direction of the helicals. Still another method is shown in Campbell Patent No. 2,173,096 of September 19, 1939.

The present invention aims to provide an improved method for this purpose relatively simple in installation and operation while at the same time permitting rapid reversal of the cables individually, with a minimum of effort and equipment, so that an operator may take the cables one by one as they come from the vulcanizers and speedily reverse each cable to prepare the cables quickly for shipment, thereby contributing to larger ouput of such cables at reduced cost.

These and other objects and advantages will be apparent from the following description, taken together with the accompanying drawings, of an illustrative embodiment thereof and preferred step sequence, and in which drawings—

Figure 1 is a somewhat reduced view of an elastic coil cable of the class described after vulcanization but before reversal;

Figure 2 is a view, somewhat diagrammatic, of method and means to which the present invention is particularly directed;

Figure 3 is a fragmentary enlarged view of expedients shown in Figure 2; and

Figure 4 is a view on the scale of Figure 2 of the cable after reversal.

Turning preliminarily to Figure 1 and referring to the cable with which the present invention is intended to deal more particularly, such cable may embody a plurality of insulated electric conductors 10, in this instance say three such conductors, which are first twisted together, and upon the composite cord so formed is then extruded a covering or sheath 11 of rubber-like vulcanizable material. The cable thus constituted is then coiled (for example, upon a rodlike mandrel not here shown) to have a central helically formed portion 12 and uncoiled ends 13, which latter initially extend in longitudinal, somewhat lapping relation with the coiled portion 12 and may be so vulcanized to resiliently set the cable in this form.

It is now desired to invert or reverse the direction of the pitch or turns of the helix of the coiled portion 12, to change it from the right-hand-screw arrangement shown in Figure 1, to, say, the left-hand-screw arrangement shown in Figure 4, with the advantageous result of enhancing the resilience and retractibility of the cable so that it may be used as an electric extension cord, for example, which may be stretched when desired and upon release will return to its closely compacted helix for conservation of space and elimination of interference with other objects.

Turning to the expedients here disclosed for accomplishing this reversal and in accordance with the present invention, there is here shown a support 14 such as a table or the like and upon which is suitably fixed a motor base 15 mounting an electric motor 16 having the usual shaft 17 arranged in this instance advantageously in a horizontal position overlying but spaced from the table 14. An electric circuit 18 leads from the motor to a switch-box 19, which may be conveniently mounted on the table 14, and thence to another switch-box 20 which may, as in this instance, rest on the floor 21, upon which the table 14 stands and upon which the operator works.

Through the switch-box 20 the circuit 18 may be connected with a current supply line 22.

The switch 20 is thus conveniently actuated by the operator as a foot switch, by pressure upon the pedal 23 to close the circuit through the lines 22 and wires 19 to cause the motor 16 to run. It will be understood that the switch 20 may be spring-actuated to break this circuit to the motor and lift the pedal 23, when the foot of the operator is lifted therefrom, as is well known in the art and need not here be further described.

The switch 19 is desirably interposed in the circuit 18 so as to permit changing the direction of running of the motor 16 and thereby the direction of rotation of the motor shaft 17. This switch 19 may have two positions, one indicated in full lines by the numeral 24, and the other indicated in broken lines by the numeral 25, for the manually operable switch-lever 26. On its casing, the switch box carries say letters "L" and "R" for example as here indicated. The latter "L" indicates that the switch-lever 26 is in the position shown in full lines as at 24 to cause rotation of the motor shaft 17 in the direction of the arrow 27, while the letter "R" indicates the position for the switch-lever 26 as indicated by the dotted lines 25 to cause rotation of the motor shaft 17 in the opposite direction and as indicated by the dotted arrow 28, for purposes which will be presently more particularly described.

Attached to the table top 14, as by a screw 29, is shown a flexible strap 30 which may be looped over the shaft and have its free end 31 readily accessible to the hand of the operator, so that when the motor is shut off, as by releasing the pedal 23, this free end 31 of the strap 30 may be pulled against the motor shaft 17 and thus frictionally retard it and bring it to a quicker stop than would be the case if it were merely left to run down, and thus expediting the operations herein set forth.

Fixed to the motor shaft 17 is a clip member 32 here shown comprising an enlarged boss portion 33 and reduced split cylinder portion 33a extending from one end of the boss portion. At its other end, the boss portion is axially recessed as at 34 to snugly receive the motor shaft 17. A radially directed set screw 34a which passes into the recess may be employed to secure the clip member 32 to the shaft for rotation with the latter. The split 35 of the split cylinder portion 33a is advantageously of V-form so as to bifurcate this portion and provide a pair of furcations 36 which are somewhat resilient and serve to resiliently grip one end of the cable as next described, the furcations being preferably complementarily notched on their inner faces as at 37 (Fig. 3) to assist in this gripping action. As so arranged, the clip portion 33a of the clip member 32 extends horizontally beyond the motor shaft and is in effect a continuation thereof adapted to rotate about an axis which passes between the furcations 36.

Further in accordance with the present invention and turning now to the treatment of the cable itself, by means of the expedients just described, the cable is secured with one end 13 between the spring jaws formed by the furcations 36 of the clip member 32, the extreme end of the cable conveniently lying somewhat transversely in the notches 37. The other end 13 of the cable may be gripped by the operator, say by the thumb 38 and forefinger 39, with desirably some tension upon the cable longitudinally and with the coiled portion 12 centermost. It will be understood that the cable, which is highly extensible, may be pulled upon say to arm's length of the operator with practically no effort, if the length of cable so require, and so as to stretch it to several times its compacted length, the tensioned cable being diagrammatically indicated as broken in Figure 2 so as to conserve space in the drawing. Within normal lengths, either short or long cords may be equally readily reversed.

When thus one end of the cable is gripped by the motor shaft through the clip member 32 and the other end is firmly gripped by the operator, the pedal 23 is pressed and the motor 16 energized to rotate the motor shaft 17 in the direction of the arrow 27. This direction, as will be seen from the drawings, is the same direction as the direction of pitch of the helix, i. e., to the right, facing the end of a right-hand screw helix such as in Figs. 1 and 2. Thereupon the cable is twisted or rotated at one end, that is its end which is gripped by the motor, about its own axis or an axis which is concentric with the longitudinal axis of the cable helix, the other end being held by the fingers of the operator against rotation. The motor is run until the coiled portion 12 is rewound and reversed in direction and brought to the arrangement shown in Figure 4, which when one faces the end of the helix is seen as a left-hand screw, so to speak. Thereupon the operator releases the pedal 23 and removes the cable from the clip member 32 whereupon the cable is now in its intended form for shipment.

This operation may be performed very quickly and expeditiously and with a minimum of effort on the part of the operator, who may thus deal rapidly with the cables one by one as they come from the vulcanizer.

Somewhat similarly, if a cable be vulcanized in the helical form of a left-hand screw-thread so to speak, in order to form a right-hand screw-thread helical when reversed, or if one of the cables be found to be imperfect for any reason after having been reversed as shown to the arrangement of Figure 4, and it be desired to restore the cable to the arrangement as shown in Figure 1, for revulcanization for example, the directional switch-lever 26 may be moved to the "R" position and a cable as shown in Figure 4 gripped by one of its ends 13 by the clip member 32 and its other end 13 gripped by the operator. The pedal 23 is then actuated and the motor run so its shaft rotates in the direction of the arrow 28 which will give or restore to the cable a right-hand screw direction of pitch of the helix of its coiled portion 12, and thus forming or returning the cable to the arrangement as shown in Figure 1. Thereupon if for revulcanization it may be revulcanized and again reversed.

It is to be understood that in the unreversed arrangement of the cable as shown in Figure 1, the ends 13 are vulcanized in a position somewhat lapping the coiled portion 12, but that when the direction of the pitch of the helix of the coiled portion 12 is inverted, as shown in Figure 4, the ends 13 then normally extend outwardly of the coiled portion.

It is to be understood that the invention is not intended to be limited to details of construction or to the sequence to steps of operation here specifically described for illustrative purposes, and that such modifications may be made as fall within the scope of the appended claims without departing from the invention.

The invention having been described, what is here claimed is:

1. The method of reversing helically coiled structures comprising a rubber-like material initially set in helically coiled form which is characterized by the steps of extending the coiled structure longitudinally, holding one end of the coiled structure to inhibit rotation thereof, twistingly rotating the other end on its own axis in the same direction as the pitch of the helix while maintaining the coiled structure stretched, and continuing said rotating operation until the direction of the coils is reversed and the structure is re-coiled in the opposite helical direction.

2. The method of reversing elastic helically coiled structures embodying a thermoactive material, which is characterized by the steps of initially setting the thermoactive material in helical form, and then relatively rotating one end of the helically set structure with respect to the other end in the same direction as the pitch of the helix while holding said other end to inhibit rotation until the direction of the coils is reversed and the structure is re-coiled in the opposite helical direction, to enhance the resilience and retractability of the coils.

RALPH D. COLLINS.
RALPH J. ARNOLD.

REFERENCES CITED

The following references are of record in the file of this patent:

UNITED STATES PATENTS

| Number | Name | Date |
|---|---|---|
| 601,445 | Martiny | Mar. 29, 1898 |
| 1,186,781 | Henry | June 13, 1916 |
| 1,282,911 | Mills | Oct. 29, 1918 |
| 1,336,159 | Rice | Apr. 6, 1920 |
| 1,446,599 | Von Veen | Feb. 27, 1923 |
| 1,646,925 | Minard | Oct. 25, 1927 |
| 1,866,952 | Steele | July 12, 1932 |
| 2,076,236 | Holloway | Apr. 6, 1937 |
| 2,173,096 | Campbell | Sept. 19, 1939 |
| 2,237,744 | Mullen | Apr. 8, 1941 |
| 2,350,174 | Lucas et al. | May 30, 1944 |
| 2,405,686 | Clark | Aug. 13, 1946 |